(12) United States Patent
Lin et al.

(10) Patent No.: US 12,440,524 B2
(45) Date of Patent: Oct. 14, 2025

(54) BACTERIOPHAGE TREATMENT AND REDUCTION IN INFLAMMATORY RESPONSE

(71) Applicants: Western Sydney Local Health District, Sydney (AU); The Westmead Institute for Medical Research, Sydney (AU)

(72) Inventors: Ching Yu Lin, Marina Del Rey, CA (US); Jonathan Ripley Iredell, Marina Del Rey, CA (US)

(73) Assignees: Western Sydney Local Health District, Sydney (AU); The Wetmead Institute for Medical Research, Sydney (AU)

( * ) Notice: Subject to any disclaimer, the term of this patent is extended or adjusted under 35 U.S.C. 154(b) by 817 days.

(21) Appl. No.: 17/404,303

(22) Filed: Aug. 17, 2021

(65) Prior Publication Data
US 2022/0152131 A1    May 19, 2022

Related U.S. Application Data

(63) Continuation of application No. 17/282,551, filed as application No. PCT/US2019/054573 on Oct. 3, 2019, now abandoned.

(60) Provisional application No. 62/741,497, filed on Oct. 4, 2018.

(51) Int. Cl.
| | |
|---|---|
| *C12N 7/00* | (2006.01) |
| *A61K 35/76* | (2015.01) |
| *A61K 45/06* | (2006.01) |
| *A61K 47/02* | (2006.01) |
| *A61P 31/04* | (2006.01) |
| *A61P 37/02* | (2006.01) |

(52) U.S. Cl.
CPC .............. *A61K 35/76* (2013.01); *A61K 45/06* (2013.01); *A61K 47/02* (2013.01); *A61P 31/04* (2018.01); *A61P 37/02* (2018.01); *C12N 7/00* (2013.01); *C12N 2795/10132* (2013.01); *C12N 2795/10233* (2013.01)

(58) Field of Classification Search
None
See application file for complete search history.

(56) References Cited

U.S. PATENT DOCUMENTS

2016/0264941 A1   9/2016 Pouillot et al.

FOREIGN PATENT DOCUMENTS

| WO | WO 2005/009451 A1 | 2/2005 | |
| WO | WO 2008/110840 A1 | 9/2008 | |
| WO | WO-2017015652 A1 * | 1/2017 | ............ A61K 35/76 |

OTHER PUBLICATIONS

Van Belleghem et al. Scientific Reports. 2017. 7:8004, 13 pages. (Year: 2017).*
Pincus et al. PLOS One. 2015. 16 pages. (Year: 2015).*
Paul-Clark et al. British Journal of Pharmacology. 2006. 148:1067-1075. (Year: 2006).*
Surbatovic et al. Scientific Reports. 2015. 5:11355, 12 pages. (Year: 2015).*
Thaden et al. The Journal of Infectious Diseases. 2024. 229:1535-45. (Year: 2024).*
Nau et al. PNAS. 2002. 99(3): 1503-1508. (Year: 2002).*
Pereverzeva et al. Eur Respir J. 2022. 59:2101856, 12 pages. (Year: 2022).*
Feezor et al. Infection and Immunity. 2003. 71(10):5803-5813. (Year: 2003).*
Wang et al. Frontiers in Cellular and Infection Microbiology. 2022. 12:801232, 11 pages. (Year: 2022).*
Yu et al. Am J Respir Crit Care Med. 2004. 169:1135-1143. (Year: 2004).*
Miedzybrodzki et al. Clin Exp Med. 2009. 9:303-312. (Year: 2009).*
Jenner et al. Nature Reviews. 2005. 3:281, 14 pages. (Year: 2005).*
Hoshikawa et al. Physiol Genomics. 2003. 12:209-219. (Year: 2003).*
Lin et al. PNAS. 2014. 111(48):17224-17229. (Year: 2014).*
Dillman et al. Toxicological Sciences. 2005. 87(1):306-314. (Year: 2005).*
Chan et al. Drug Discovery & Development. 2006. 4 pages. (Year: 2006).*
Kendrick. "A gene's mRNA level doe not usually predict its protein level". 2014. Kendrick Labs, Inc. 8 pages. (Year: 2014).*
Pascal et al. BMC Genomics. 2008. 9:246, 13 pages. (Year: 2008).*
Fillerova et al. Journal of Clinical Microbiology. 2017. 55(9):2686-2697. (Year: 2017).*
Ahn et al., Gene Expression-Based Classifiers Identify Staphylococcus aureus Infection In Mice And Humans, PLOS One, vol. 8, Issue 1, e48979, 16 pages, 2013. (Year: 2013).*
Khawaldeh et al., Bacteriophage therapy for refractory Pseudomonas aeruginosa urinary tract infection, Journal of Medical Microbiology, vol. 60, pp. 1697-1700, 2011.
Lin et al., Phage therapy: An alternative to antibiotics in the age of multi-drug resistance, World Journal of Gastrointestinal Pharmacology and Therapeutics, vol. 8, No. 3, pp. 162-173, 2017.
Zhang et al., Bacteriophage effectively kills multidrug resistant Staphylococcus aureus clinical isolates from chronic rhinosinusitis patients, International Forum of Allergy & Rhinology, vol. 8, No. 3, pp. 406-414, 2018.
Extended European Search Report issued on Jul. 19, 2022 in European Patent Application No. 19869558.7.
Berge et al., Pharmaceutical Salts, Journal of Pharmaceutical Science, vol. 66, No. 1, 1977, 19 pages.

(Continued)

*Primary Examiner* — Joseph G. Dauner
(74) *Attorney, Agent, or Firm* — Knobbe, Martens, Olson & Bear, LLP

(57) ABSTRACT

The present invention relates to the treatment of bacterial infections and the reduction of inflammatory response using bacteriophage compositions. In an aspect, provided herein are methods of treating a bacterial infection characterized by inflammation in a subject, the method comprising administering to the subject a bacteriophage composition that is essentially free of impurities, wherein the composition reduces inflammation.

16 Claims, 5 Drawing Sheets

(56) References Cited

OTHER PUBLICATIONS

Khatamai, et al., Bacterial lysis, autophagy and innate immune responses during adjunctive phage therapy in a child, EMBO Molecular Medicine, e13936, 2021, 9 pages.

Remington: The Science and Practice of Pharmacy, 20th Edition, Gennaro, Ed., Lippincott, Williams & Wilkins, Chapter 72, pp. 1399-1404, 2003.

Thompson et al., Clustal W: Improving the Sensitivity of Progressive Multiple Sequence Alignment Through Sequence Weighting, Position-Specific Gap Penalties and Weight Matrix Choice, Nucleic Acids Research, vol. 22, No. 22, pp. 4673-4680, 1994.

Van Walle et al., Align-M—A New Algorithm for Multiple Alignment of Highly Divergent Sequences, Bioinformatics, col. 20, No. 9, pp. 1428-1435, 2004.

\* cited by examiner

BACTERIOPHAGE TREATMENT AND REDUCTION IN INFLAMMATORY RESPONSE

PRIORITY AND CROSS REFERENCE TO RELATED APPLICATIONS

This application is a Continuation Application of U.S. application Ser. No. 17/282,551, filed Apr. 2, 2021, which is the U.S. National Stage Application under 35 U.S.C. § 371 of International Application No. PCT/US2019/054573, filed Oct. 3, 2019, designating the U.S. and published in English as WO 2020/072823 A1 on Apr. 9, 2020, which claims the benefit of U.S. Application No. 62/741,497, filed Oct. 4, 2018. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

Described herein are compositions of bacteriophages, and use of the same for medical applications.

BACKGROUND

The rising tide of human pathogens that are resistant to antibiotics has created an urgent need for new treatments for serious bacterial infections including those that cause inflammation. Novel approaches that circumvent traditional mechanisms of antibiotic resistance, can be effective against biofilms, and avoid disruption of the native gut flora are especially desirable. This clinical challenge has sparked renewed interest in bacteriophage (phage) therapy. Demonstration of efficacy in an animal model of infection is a preliminary step in the development of a new therapeutic agent.

BRIEF SUMMARY OF THE INVENTION

In an aspect, provided herein are methods of treating a bacterial infection characterized by inflammation in a subject, the method comprising administering to the subject a bacteriophage composition that is essentially free of impurities, wherein the composition reduces inflammation.

In an aspect, provided herein are methods for determining efficacy of a bacteriophage formulation in a subject receiving bacteriophage therapy to treat an inflammatory bacterial infection. The methods include obtaining a first gene expression profile for two or more informative genes in a first biological sample, wherein the first biological sample is obtained from the subject prior to administration of the bacteriophage therapy. The methods include obtaining an additional or subsequent gene expression profile for the two or more informative genes in a subsequent biological sample, wherein the additional or subsequent biological sample is obtained from the subject after administration of the bacteriophage therapy. The methods include correlating the first gene expression profile and the subsequent gene expression profile and assigning the difference in the first and subsequent gene expression profiles a positive, intermediate, or negative assay score. The methods include treating the patient based on the positive, intermediate, or negative assay score. Treating the patient may include therapeutic intervention.

DETAILED DESCRIPTION

Definitions

Figure 1:
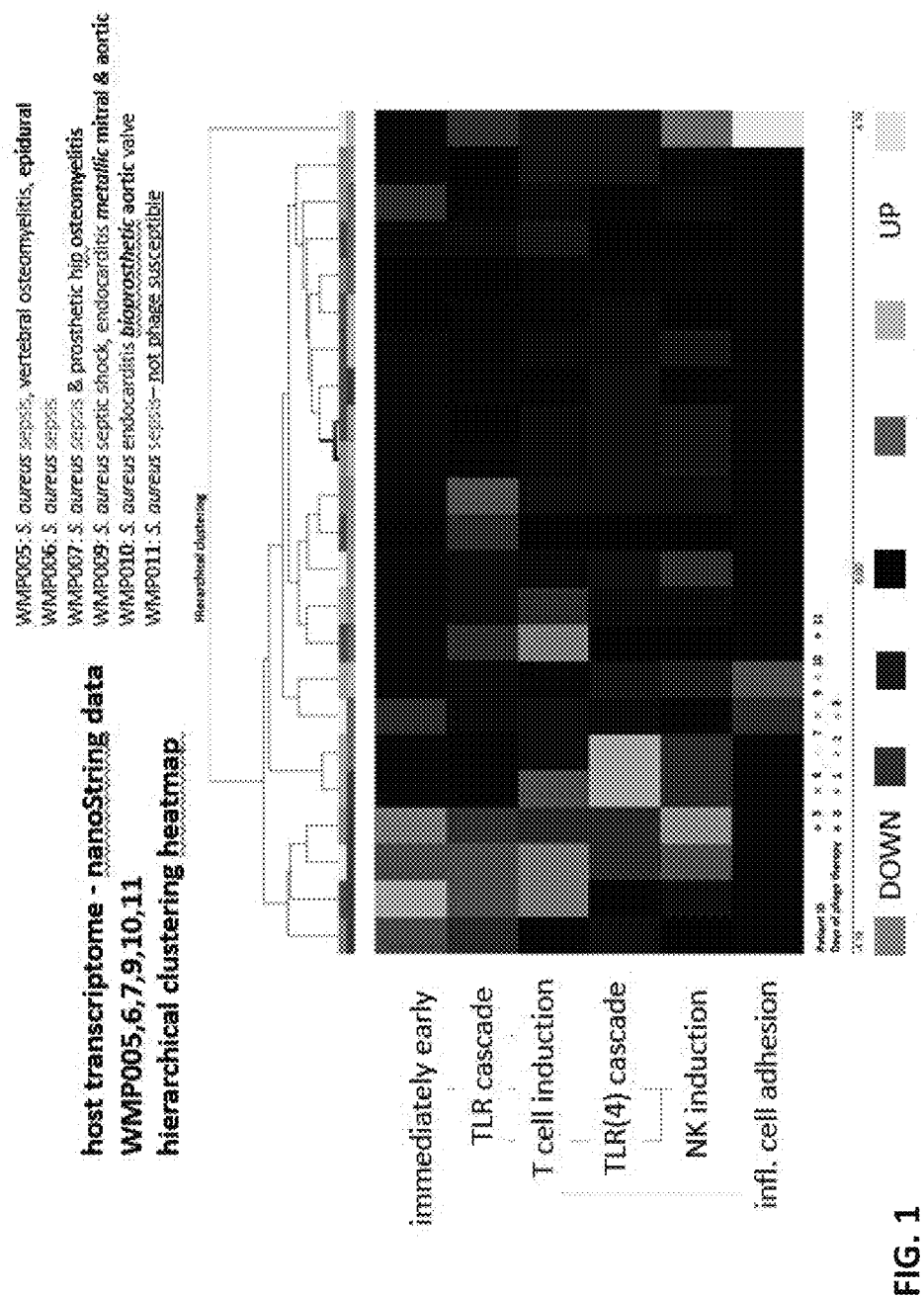
FIG. 1 depicts the upregulated and downregulated gene expression in six different patients with bacterial infections characterized by inflammation and caused by *S. aureus*. Samples were taken before and after bacteriophage treatment in the patients.

It must be noted that as used herein and in the appended claims, the singular forms "a," "an," and "the" include plural referents unless the context clearly dictates otherwise. Thus, for example, reference to "a bacteriophage composition" includes a plurality of such candidate agents and reference to "the bacteriophage" includes reference to one or more bacteriophages and equivalents thereof known to those skilled in the art, and so forth.

As used herein, the term "about" when used before a numerical designation, e.g., temperature, time, amount, concentration, and such other, including a range, indicates approximations which may vary by (+) or (−) 10%, 5%, or 1%.

When a range (e.g., dosage range) is listed herein, it is to be understood that the value may include any value or range within the recited range(s), including endpoints.

In this disclosure, "comprises," "comprising," "containing" and "having" and the like can have the meaning ascribed to them in U.S. Patent law and can mean "includes," "including," and the like. "Consisting essentially of or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

The term "mutant" as used herein refers to a bacteriophage differing genetically from a parent or wild-type phage by one or more nucleotides but still retaining the ability to infect and lyse *Staphylococcus* target bacteria. Mutants typically comprise e.g., silent mutations, conservative mutations, minor deletions, and/or minor replications of genetic material, and retain phenotypic characteristics of the reference bacteriophage. In a preferred embodiment, the mutants retain any observable characteristic or property that is dependent upon the genome of the bacteriophage, i.e. phenotypic characteristics of said bacteriophage and/or activity against the target bacteria strains. Preferred mutants have less than 5% nucleic acid variation as compared to the genome of the reference bacteriophage, even more preferably less than 4%, more preferably less than 2%. Alternatively, or in combination, mutants have preferably less than 5% amino acid variation in a coded polypeptide sequence as compared to a polypeptide of the reference bacteriophage.

The term "% identity" or "% sequence identity" in relation to nucleic acid or amino acid sequences designates the level of identity or homology between said sequences and may be determined by techniques known per se in the art. Any of a variety of sequence alignment methods can be used to determine percent identity, including, without limitation, global methods, local methods and hybrid methods, such as segment approach methods. Protocols to determine percent identity are routine procedures within the scope of one skilled in the art. Global methods align sequences from the beginning to the end of the molecule and determine the best alignment by adding up scores of individual nucleotide pairs and by imposing gap penalties. Non-limiting methods include, e.g., CLUSTAL W, see, e.g., Julie D. Thompson et al., CLUSTAL W: Improving the Sensitivity of Progressive Multiple Sequence Alignment Through Sequence Weighting, Position-Specific Gap Penalties and Weight Matrix Choice, 22(22) Nucleic Acids Research 4673-4680 (1994); and iterative refinement. Non-limiting methods include, e.g., BLAST, Match-box, see, e.g., Align-M, see, e.g., Ivo Van Walle et al., Align-M-A New Algorithm for Multiple Alignment of Highly Divergent Sequences, 20(9) Bioinformatics: 1428-1435 (2004). This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 100 nucleotides in length, or more preferably over a region that is 100-1000 or more nucleotides in length.

A use or method typically comprises administering a bacteriophage composition described herein to a subject. As used herein, a "subject" is a mammal, such as a human or other animal. Preferably, the subject is a human.

The term "purified" or "isolated" as used herein indicates that the bacteriophage are removed from its original environment in which it naturally occurs. In particular, a purified or isolated bacteriophage is, e.g., cultivated, purified and/or cultured separately from the environment in which it is naturally located.

The phrase "substantially purified" or "substantially isolated," as used herein, describes a compound, e.g., a protein or polypeptide or cellular component such as phage that has been separated from components which naturally accompany it. Typically, a compound or phage is substantially pure when at least 60%, more preferably at least 75%, more preferably at least 80%, more preferably at least 90%, more preferably at least 95%, more preferably at least 98%, and most preferably at least 99% of the total material (by volume, by wet or dry weight, or by mole percent or mole fraction) in a sample is the target of interest.

The terms "disease" or "condition" refer to a state of being or health status of a patient or subject capable of being treated with the compounds or methods provided herein. The disease may be a cardiovascular disease. The disease may be a lung disease. The disease may be a cancer. The disease may be an autoimmune disease. The disease may be an inflammatory disease. The disease may be an infectious disease. The infectious disease may be a bacterial infection. In some further instances, "cancer" refers to human cancers and carcinomas, sarcomas, adenocarcinomas, lymphomas, leukemias, etc., including solid and lymphoid cancers, kidney, breast, lung, bladder, colon, ovarian, prostate, pancreas, stomach, brain, head and neck, skin, uterine, testicular, glioma, esophagus, and liver cancer, including hepatocarcinoma, lymphoma, including B-acute lymphoblastic lymphoma, non-Hodgkin's lymphomas (e.g., Burkitt's, Small Cell, and Large Cell lymphomas), Hodgkin's lymphoma, leukemia (including AML, ALL, and CML), or multiple myeloma.

As used herein, the term "inflammatory disease" refers to a disease or condition characterized by aberrant inflammation (e.g. an increased level of inflammation compared to a control such as a healthy person not suffering from a disease). Examples of inflammatory diseases include autoimmune diseases, arthritis, rheumatoid arthritis, psoriatic arthritis, juvenile idiopathic arthritis, multiple sclerosis, systemic lupus erythematosus (SLE), myasthenia gravis, juvenile onset diabetes, diabetes mellitus type 1, Guillain-Barre syndrome, Hashimoto's encephalitis, Hashimoto's thyroiditis, ankylosing spondylitis, psoriasis, Sjogren's syndrome, vasculitis, glomerulonephritis, auto-immune thyroiditis, Behcet's disease, Crohn's disease, ulcerative colitis, bullous pemphigoid, sarcoidosis, ichthyosis, Graves ophthalmopathy, inflammatory bowel disease, Addison's disease, Vitiligo, asthma, allergic asthma, acne vulgaris, celiac disease, chronic prostatitis, inflammatory bowel disease, pelvic inflammatory disease, reperfusion injury, ischemia reperfusion injury, stroke, sarcoidosis, transplant rejection, interstitial cystitis, atherosclerosis, scleroderma, and atopic dermatitis.

"Inflammatory conditions" and some inflammatory diseases can be attributed to bacterial infections. Examples of bacterial infections characterized by inflammation include bacteremia, septicemia, sepsis, septic shock, infective endocarditis, prosthetic valve endocarditis, diabetic foot ulcers, infections in burn patients, implant infection such as vertebral osteomyelitis, prosthetic joint osteomyelitis, prosethetic joint infection, aortic and/or mitral valve endocarditis, chronic rhinosinusitis, sinus infection, lung infection, urinary tract infection and intra-abdominal infection.

The terms "treating", or "treatment" refers to any indicia of success in the therapy or amelioration of an injury, disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; improving a patient's physical or mental well-being. The treatment or amelioration of symptoms can be based on objective or subjective parameters; including the results of a physical examination, neuropsychiatric exams, and/or a psychiatric evaluation. The term "treating" and conjugations thereof, may include prevention of an injury, pathology, condition, or disease. In embodiments, treating is preventing. In embodiments, treating does not include preventing.

"Treating" or "treatment" as used herein (and as well-understood in the art) also broadly includes any approach for obtaining beneficial or desired results in a subject's condition, including clinical results. Beneficial or desired clinical results can include, but are not limited to, alleviation or amelioration of one or more symptoms or conditions, diminishment of the extent of a disease, stabilizing (i.e., not worsening) the state of disease, prevention of a disease's transmission or spread, delay or slowing of disease progression, amelioration or palliation of the disease state, diminishment of the reoccurrence of disease, and remission, whether partial or total and whether detectable or undetectable. In other words, "treatment" as used herein includes any cure, amelioration, or prevention of a disease. Treatment may prevent the disease from occurring; inhibit the disease's spread; relieve the disease's symptoms (e.g., ocular pain, seeing halos around lights, red eye, very high intraocular pressure), fully or partially remove the disease's underlying cause, shorten a disease's duration, or do a combination of these things.

"Treating" and "treatment" as used herein include prophylactic treatment. Treatment methods include administering to a subject a therapeutically effective amount of an active agent. The administering step may consist of a single administration or may include a series of administrations. The length of the treatment period depends on a variety of factors, such as the severity of the condition, the age of the patient, the concentration of active agent, the activity of the compositions used in the treatment, or a combination thereof. It will also be appreciated that the effective dosage of an agent used for the treatment or prophylaxis may increase or decrease over the course of a particular treatment or prophylaxis regime. Changes in dosage may result and become apparent by standard diagnostic assays known in the art. In some instances, chronic administration may be required. For example, the compositions are administered to the subject in an amount and for a duration sufficient to treat the patient. In embodiments, the treating or treatment is no prophylactic treatment.

The term "prevent" refers to a decrease in the occurrence of disease symptoms in a patient. As indicated above, the prevention may be complete (no detectable symptoms) or partial, such that fewer symptoms are observed than would likely occur absent treatment.

"Patient" or "subject in need thereof" refers to a living organism suffering from or prone to a disease or condition that can be treated by administration of a pharmaceutical composition as provided herein. Non-limiting examples include humans, other mammals, bovines, rats, mice, dogs, monkeys, goat, sheep, cows, deer, and other non-mammalian animals. In some embodiments, a patient is human.

A "effective amount" is an amount sufficient for a compound to accomplish a stated purpose relative to the absence of the compound (e.g. achieve the effect for which it is administered, treat a disease, reduce enzyme activity, increase enzyme activity, reduce a signaling pathway, or reduce one or more symptoms of a disease or condition). An example of an "effective amount" is an amount sufficient to contribute to the treatment, prevention, or reduction of a symptom or symptoms of a disease, which could also be referred to as a "therapeutically effective amount." A "reduction" of a symptom or symptoms (and grammatical equivalents of this phrase) means decreasing of the severity or frequency of the symptom(s), or elimination of the symptom(s). A "prophylactically effective amount" of a drug is an amount of a drug that, when administered to a subject, will have the intended prophylactic effect, e.g., preventing or delaying the onset (or reoccurrence) of an injury, disease, pathology or condition, or reducing the likelihood of the onset (or reoccurrence) of an injury, disease, pathology, or condition, or their symptoms. The full prophylactic effect does not necessarily occur by administration of one dose, and may occur only after administration of a series of doses. Thus, a prophylactically effective amount may be administered in one or more administrations. An "activity decreasing amount," as used herein, refers to an amount of antagonist required to decrease the activity of an enzyme relative to the absence of the antagonist. A "function disrupting amount," as used herein, refers to the amount of antagonist required to disrupt the function of an enzyme or protein relative to the absence of the antagonist. The exact amounts will depend on the purpose of the treatment, and will be ascertainable by one skilled in the art using known techniques (see, e.g., Lieberman, *Pharmaceutical Dosage Forms* (vols. 1-3, 1992); Lloyd, *The Art, Science and Technology of Pharmaceutical Compounding* (1999); Pickar, *Dosage Calculations* (1999); and *Remington: The Science and Practice of Pharmacy*, 20th Edition, 2003, Gennaro, Ed., Lippincott, Williams & Wilkins).

For any compound described herein, the therapeutically effective amount can be initially determined from cell culture assays. Target concentrations will be those concentrations of active compound(s) that are capable of achieving the methods described herein, as measured using the methods described herein or known in the art.

As is well known in the art, therapeutically effective amounts for use in humans can also be determined from animal models. For example, a dose for humans can be formulated to achieve a concentration that has been found to be effective in animals. The dosage in humans can be adjusted by monitoring compounds effectiveness and adjusting the dosage upwards or downwards, as described above. Adjusting the dose to achieve maximal efficacy in humans based on the methods described above and other methods is well within the capabilities of the ordinarily skilled artisan.

The term "therapeutically effective amount," as used herein, refers to that amount of the therapeutic agent sufficient to ameliorate the disorder, as described above. For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a control.

Dosages may be varied depending upon the requirements of the patient and the compound being employed. The dose administered to a patient, in the context of the present disclosure, should be sufficient to effect a beneficial therapeutic response in the patient over time. The size of the dose also will be determined by the existence, nature, and extent of any adverse side-effects. Determination of the proper dosage for a particular situation is within the skill of the practitioner. Generally, treatment is initiated with smaller dosages which are less than the optimum dose of the compound. Thereafter, the dosage is increased by small increments until the optimum effect under circumstances is reached. Dosage amounts and intervals can be adjusted individually to provide levels of the administered compound effective for the particular clinical indication being treated. This will provide a therapeutic regimen that is commensurate with the severity of the individual's disease state.

As used herein, the term "administering" means oral administration, administration as a suppository, topical contact, intravenous, parenteral, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc. In embodiments, the administering does not include administration of any active agent other than the recited active agent.

"Co-administer" it is meant that a composition described herein is administered at the same time, just prior to, or just after the administration of one or more additional therapies. The compounds provided herein can be administered alone or can be co-administered to the patient. Co-administration is meant to include simultaneous or sequential administration of the compounds individually or in combination (more than one compound). Thus, the preparations can also be combined, when desired, with other active substances (e.g. to reduce metabolic degradation). The compositions of the present disclosure can be delivered transdermally, by a topical route, or formulated as applicator sticks, solutions, suspensions, emulsions, gels, creams, ointments, pastes, jellies, paints, powders, and aerosols.

A "cell" as used herein, refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaroytic cells. Prokaryotic cells include but are not limited to bacteria. Eukaryotic cells include but are not limited to yeast cells and cells derived from plants and animals, for example mammalian, insect (e.g., *spodoptera*) and human cells. Cells may be useful when they are naturally nonadherent or have been treated not to adhere to surfaces, for example by trypsinization.

"Control" or "control experiment" is used in accordance with its plain ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects. In some embodiments, a control is the measurement of the activity of a protein in the absence of a compound as described herein (including embodiments and examples).

The term "infection" or "infectious disease" refers to a disease or condition that can be caused by organisms such as a bacterium, virus, fungi or any other pathogenic microbial agents. In embodiments, the infectious disease is caused by a pathogenic bacteria. Pathogenic bacteria are bacteria which cause diseases (e.g., in humans). In embodiments, the infectious disease is a bacteria associated disease (e.g., tuberculosis, which is caused by *Mycobacterium tuberculosis*). Non-limiting bacteria associated diseases include pneumonia, which may be caused by bacteria such as *Streptococcus* and *Pseudomonas*; or foodborne illnesses, which can be caused by bacteria such as *Shigella, Campylobacter*, and *Salmonella*. Bacteria associated diseases also includes tetanus, typhoid fever, diphtheria, syphilis, and leprosy. In embodiments, the disease is Bacterial vaginosis (i.e. bacteria that change the vaginal microbiota caused by an overgrowth of bacteria that crowd out the Lactobacilli species that maintain healthy vaginal microbial populations) (e.g., yeast infection, or *Trichomonas vaginalis*); Bacterial meningitis (i.e. a bacterial inflammation of the meninges); Bacterial pneumonia (i.e. a bacterial infection of the lungs); Urinary tract infection; Bacterial gastroenteritis; or Bacterial skin infections (e.g. impetigo, or cellulitis). Bacterial diseases that are characterized by inflammation include bacteremia, sepsis, septic shock, endocarditis, pneumonia, prosthetic valve endocarditis, and lung infection. In embodiments, the infectious disease is a *Staphylococcus aureus, Pseudomonas aeruginosa, Campylobacter jejuni, Enterococcus faecalis, Haemophilus influenzae, Helicobacter pylori, Klebsiella pneumoniae, Legionella pneumophila, Neisseria gonorrhoeae, Neisseria meningitides, Streptococcus pneumonia*, or *Vibrio cholera* infection.

The term "immune response" and the like refer, in the usual and customary sense, to a response by an organism that protects against disease. The response can be mounted by the innate immune system or by the adaptive immune system, as well known in the art.

The terms "modulating immune response" and the like refer to a change in the immune response of a subject as a consequence of administration of an agent, e.g., a compound as disclosed herein, including embodiments thereof. Accordingly, an immune response can be activated or deactivated as a consequence of administration of an agent, e.g., a compound as disclosed herein, including embodiments thereof.

"B Cells" or "B lymphocytes" refer to their standard use in the art. B cells are lymphocytes, a type of white blood cell (leukocyte), that develops into a plasma cell (a "mature B cell"), which produces antibodies. An "immature B cell" is a cell that can develop into a mature B cell. Generally, pro-B cells undergo immunoglobulin heavy chain rearrangement to become pro B pre B cells, and further undergo immunoglobulin light chain rearrangement to become an immature B cells. Immature B cells include T1 and T2 B cells.

"T cells" or "T lymphocytes" as used herein are a type of lymphocyte (a subtype of white blood cell) that plays a central role in cell-mediated immunity. They can be distinguished from other lymphocytes, such as B cells and natural killer cells, by the presence of a T-cell receptor on the cell surface. T cells include, for example, natural killer T (NKT) cells, cytotoxic T lymphocytes (CTLs), regulatory T (Treg) cells, and T helper cells. Different types of T cells can be distinguished by use of T cell detection agents.

A "memory T cell" is a T cell that has previously encountered and responded to its cognate antigen during prior infection, encounter with cancer or previous vaccination. At a second encounter with its cognate antigen memory T cells can reproduce (divide) to mount a faster and stronger immune response than the first time the immune system responded to the pathogen.

A "regulatory T cell" or "suppressor T cell" is a lymphocyte which modulates the immune system, maintains tolerance to self-antigens, and prevents autoimmune disease.

The term "gene" means the segment of DNA involved in producing a protein; it includes regions preceding and following the coding region (leader and trailer) as well as intervening sequences (introns) between individual coding segments (exons). The leader, the trailer as well as the introns include regulatory elements that are necessary during the transcription and the translation of a gene. Further, a "protein gene product" is a protein expressed from a particular gene.

The terms "virus" or "virus particle" are used according to its plain ordinary meaning within Virology and refers to a virion including the viral genome (e.g. DNA, RNA, single strand, double strand), viral capsid and associated proteins, and in the case of enveloped viruses (e.g. herpesvirus), an envelope including lipids and optionally components of host cell membranes, and/or viral proteins.

The term "plaque forming units" is used according to its plain ordinary meaning in Virology and refers to a unit of measurement based on the number of plaques per unit volume of a sample. In some embodiments the units are based on the number of plaques that could form when infecting a monolayer of susceptible cells. Plaque forming unit equivalents are units of measure of inactivated virus. In some embodiments, plaque forming unit equivalents are derived from plaque forming units for a sample prior to inactivation. In embodiments, plaque forming units are abbreviated "Pfu".

The terms "multiplicity of infection" or "MOI" are used according to its plain ordinary meaning in Virology and refers to the ratio of components (e.g., poxvirus) to the target (e.g., cell) in a given area. In embodiments, the area is assumed to be homogenous.

The term "replicate" is used in accordance with its plain ordinary meaning and refers to the ability of a cell or virus to produce progeny. A person of ordinary skill in the art will immediately understand that the term replicate when used in connection with DNA, refers to the biological process of producing two identical replicas of DNA from one original DNA molecule.

In the context of a virus, the term "replicate" includes the ability of a virus to replicate (duplicate the viral genome and packaging said genome into viral particles) in a host cell and subsequently release progeny viruses from the host cell, which results in the lysis of the host cell (i.e. bacterial cell). A "replication-competent" virus as provided herein refers to a virus (phage) that is capable of replicating in a cell.

The term "phage" or "bacteriophage" refers to a virus that parasitizes a bacterium by infecting it and reproducing inside it. Bacteriophages occur abundantly in the biosphere, with different genomes, and lifestyles, Examples of Family classification of bacteriophage include Myoviridae, Siphoviridae, Podoviridae, Lipothrixviridae, Rudiviridae, Ampullaviridae, Bicaudaviridae, Clavaviridae, Cortico, Viridae, Cystoviridae, Fuselloviridae, Globuloviridae, Guttaviridae, Inoviridae, Leviviridae, Microviridae, Plasmaviridae, and Tectiviridae.

The term "lytic" or "lytic activity" designates the property of a bacteriophage to case lysis of a bacterial cell. The lytic activity of a bacteriophage can be tested on a bacteria (e.g., *P. aeruginosa* strains) according to techniques known in the art. See, e.g., Examples; U.S. Patent Pub. No. 2016/0264941, which is incorporated herein by reference in its entirety.

The term "obligate lytic" or "strictly lytic" as used herein with reference to bacteriophage indicates that the bacteriophage cannot integrate into the host bacterial genome (e.g., as a prophage).

The term "pharmaceutically acceptable salts" is meant to include salts of the active compounds that are prepared with relatively nontoxic acids or bases, depending on the particular substituents found on the compounds described herein. When compounds of the present disclosure contain relatively acidic functionalities, base addition salts can be obtained by contacting the neutral form of such compounds with a sufficient amount of the desired base, either neat or in a suitable inert solvent. Examples of pharmaceutically acceptable base addition salts include sodium, potassium, calcium, ammonium, organic amino, or magnesium salt, or a similar salt. When compounds of the present disclosure contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, oxalic, methanesulfonic, and the like. Also included are salts of amino acids such as arginate and the like, and salts of organic acids like glucuronic or galactunoric acids and the like (see, for example, Berge et al., "Pharmaceutical Salts", *Journal of Pharmaceutical Science,* 1977, 66, 1-19). Certain specific compounds of the present disclosure contain both basic and acidic functionalities that allow the compounds to be converted into either base or acid addition salts.

Certain compounds of the present disclosure can exist in unsolvated forms as well as solvated forms, including hydrated forms. In general, the solvated forms are equivalent to unsolvated forms and are encompassed within the scope of the present disclosure. Certain compounds of the present disclosure may exist in multiple crystalline or amorphous forms. In general, all physical forms are equivalent for the uses contemplated by the present disclosure and are intended to be within the scope of the present disclosure.

"Pharmaceutically acceptable excipient" and "pharmaceutically acceptable carrier" refer to a substance that aids the administration of an active agent to and absorption by a subject and can be included in the compositions of the present disclosure without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethycellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the disclosure. One of skill in the art will recognize that other pharmaceutical excipients are useful in the present disclosure.

The term "preparation" is intended to include the formulation of the active compound with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

An "inhibitor" refers to a compound (e.g. compounds described herein) that reduces activity when compared to a control, such as absence of the compound or a compound with known inactivity.

"Contacting" is used in accordance with its plain ordinary meaning and refers to the process of allowing at least two distinct species (e.g. chemical compounds including biomolecules or cells) to become sufficiently proximal to react, interact or physically touch. It should be appreciated; however, the resulting reaction product can be produced directly from a reaction between the added reagents or from an intermediate from one or more of the added reagents that can be produced in the reaction mixture.

The term "contacting" may include allowing two species to react, interact, or physically touch, wherein the two species may be a compound as described herein and a protein or enzyme. In some embodiments, contacting includes allowing a compound described herein to interact with a protein or enzyme that is involved in a signaling pathway.

As defined herein, the term "activation", "activate", "activating", "activator" and the like in reference to a protein-inhibitor interaction means positively affecting (e.g. increasing) the activity or function of the protein relative to the activity or function of the protein in the absence of the activator. In embodiments activation means positively affecting (e.g. increasing) the concentration or levels of the protein relative to the concentration or level of the protein in the absence of the activator. The terms may reference activation, or activating, sensitizing, or up-regulating signal transduction or enzymatic activity or the amount of a protein decreased in a disease. Thus, activation may include, at least in part, partially or totally increasing stimulation, increasing or enabling activation, or activating, sensitizing, or up-regulating signal transduction or enzymatic activity or the amount of a protein associated with a disease (e.g., a protein which is decreased in a disease relative to a non-diseased control). Activation may include, at least in part, partially or totally increasing stimulation, increasing or enabling activation, or activating, sensitizing, or up-regulating signal transduction or enzymatic activity or the amount of a protein The terms "agonist," "activator," "upregulator," etc. refer to a substance capable of detectably increasing the expression or activity of a given gene or protein. The agonist can increase expression or activity 10%, 20%, 30%, 40%, 50%, 60%, 70%, 80%, 90% or more in comparison to a control in the absence of the agonist. In certain instances, expression or activity is 1.5-fold, 2-fold, 3-fold, 4-fold, 5-fold, 10-fold or higher than the expression or activity in the absence of the agonist.

As defined herein, the term "inhibition", "inhibit", "inhibiting" and the like in reference to a protein-inhibitor interaction means negatively affecting (e.g. decreasing) the activity or function of the protein relative to the activity or function of the protein in the absence of the inhibitor. In embodiments inhibition means negatively affecting (e.g. decreasing) the concentration or levels of the protein relative to the concentration or level of the protein in the absence of the inhibitor. In embodiments inhibition refers to reduction of a disease or symptoms of disease. In embodiments, inhibition refers to a reduction in the activity of a particular protein target. Thus, inhibition includes, at least in part, partially or totally blocking stimulation, decreasing, preventing, or delaying activation, or inactivating, desensitizing, or down-regulating signal transduction or enzymatic activity or the amount of a protein. In embodiments, inhibition refers to a reduction of activity of a target protein resulting from a direct interaction (e.g. an inhibitor binds to the target protein). In embodiments, inhibition refers to a reduction of activity of a target protein from an indirect interaction (e.g. an inhibitor binds to a protein that activates the target protein, thereby preventing target protein activation).

The terms "inhibitor," "repressor" or "antagonist" or "downregulator" interchangeably refer to a substance capable of detectably decreasing the expression or activity of a given gene or protein. The antagonist can decrease expression or activity 10%, 20%, 30%, 40%, 50%, 60%, 70%, 80%, 90% or more in comparison to a control in the absence of the antagonist. In certain instances, expression or activity is 1.5-fold, 2-fold, 3-fold, 4-fold, 5-fold, 10-fold or lower than the expression or activity in the absence of the antagonist.

The term "expression" includes any step involved in the production of the polypeptide including, but not limited to, transcription, post-transcriptional modification, translation, post-translational modification, and secretion. Expression can be detected using conventional techniques for detecting protein (e.g., ELISA, Western blotting, flow cytometry, immunofluorescence, immunohistochemistry, etc.).

The term "modulator" refers to a composition that increases or decreases the level of a target molecule or the function of a target molecule or the physical state of the target of the molecule relative to the absence of the modulator.

The term "modulate" is used in accordance with its plain ordinary meaning and refers to the act of changing or varying one or more properties. "Modulation" refers to the process of changing or varying one or more properties. For example, as applied to the effects of a modulator on a target protein, to modulate means to change by increasing or decreasing a property or function of the target molecule or the amount of the target molecule.

The term "associated" or "associated with" in the context of a substance or substance activity or function associated with a disease (e.g. a protein associated disease, a cancer (e.g., cancer, inflammatory disease, autoimmune disease, or infectious disease)) means that the disease (e.g. cancer, inflammatory disease, autoimmune disease, or infectious disease) is caused by (in whole or in part), or a symptom of the disease is caused by (in whole or in part) the substance or substance activity or function. As used herein, what is described as being associated with a disease, if a causative agent, could be a target for treatment of the disease.

The term "aberrant" as used herein refers to different from normal. When used to describe enzymatic activity or protein function, aberrant refers to activity or function that is greater or less than a normal control or the average of normal non-diseased control samples. Aberrant activity may refer to an amount of activity that results in a disease, wherein returning the aberrant activity to a normal or non-disease-associated amount (e.g. by administering a compound or using a method as described herein), results in reduction of the disease or one or more disease symptoms.

The term "signaling pathway" as used herein refers to a series of interactions between cellular and optionally extracellular components (e.g. proteins, nucleic acids, small molecules, ions, lipids) that conveys a change in one component to one or more other components, which in turn may convey a change to additional components, which is optionally propagated to other signaling pathway components.

Compositions

In an aspect, provided herein are methods of treating a bacterial infection characterized by inflammation in a subject. The methods include administering to the subject a bacteriophage composition that reduces inflammation.

In embodiments, the bacteriophage composition includes one or more bacteriophage from Myoviridae, Siphoviridae, Podoviridae, Lipothrixviridae, Rudiviridae, Ampullaviridae, Bicaudaviridae, Clavaviridae, Cortico, Viridae, Cystoviridae, Fuselloviridae, Globuloviridae, Guttaviridae, Inoviridae, Leviviridae, Microviridae, Plasmaviridae, or Tectiviridae. In embodiments, the bacteriophage compositions include two or more bacteriophage from the family Myoviridae. In embodiments, the bacteriophage composition includes two or more bacteriophage from the family Podoviridae.

In embodiments, the bacteriophage composition includes one or more bacteriophage selected from Sa87 (deposit reference ECACC17020903), J-Sa36 (deposit reference ECACC17020903) and Sa83 (deposit reference ECACC17020902) or mutants thereof. In embodiments, the bacteriophage composition includes one or more bacteriophage selected from Pa223 (deposit reference ECACC 17062002), Pa222 (deposit reference ECACC 17062003), Pa193 (deposit reference ECACC 17062004), and Pa204 (deposit reference ECACC 17062006), or mutants thereof.

In embodiments, the bacteriophage composition targets one or more bacterial strains. In embodiments, the bacteriophage composition targets one or more species of the genera *Staphylococcus, Helicobacter, Klebsiella, Listeria, Mycobacterium, Escherichia, Meningococcus, Campylobacter, Streptococcus, Enterococcus, Shigella, Pseudomonas* (E.G., *Pseudomonas Aeruginosa*), *Burkholderia, Clostridium, Legionella, Acetinobacter, Salmonella*, or combinations thereof. In embodiments, the bacteriophage composition targets one or more *Staphylococcus* species and/or strains (e.g., one or more *S. aureus* strains). In an embodiment, a *Staphylococcus aureus* strain targeted is a methicillin-resistant *Staphylococcus aureus* (mrsa). In embodiments, the bacteriophage composition targets one or more *Pseudomonas* species and/or strains (e.g., one or more *Pseudomonas aeruginosa* strains). In an embodiment, a *Pseudomonas aeruginosa* targeted is a multi-drug resistant *Pseudomonas aeruginosa*.

In embodiments, the bacteriophages of a composition may be provided in the form of a single therapeutic composition (preferred) or as a number of separate compositions each comprising one or more members of the composition. In embodiments where the bacteriophages are provided in a number of separate compositions, said bacteriophages may be administered to a subject sequentially or simultaneously.

In embodiments, where more than one bacteriophage is present in the bacteriophage composition, each bacteriophage may be present at a ratio of between 1:10 and 10:1 (or any sub value or subrange there between including the endpoints) compared to the amount (e.g., concentration) of any other bacteriophage in the composition. Preferably, each bacteriophage is present at a ratio of about 1:1 compared to one or more other bacteriophages in the composition.

A bacteriophage for inclusion in a composition may be propagated by any suitable method known in the art. For example one or more bacteriophage(s) may be grown separately in host bacterial strains capable of supporting growth of the bacteriophage. Typically, the bacteriophage will be grown in said host bacterial strain to high concentrations, titrated and combined to form the composition. The amount of each bacteriophage employed (e.g., in a bacteriophage composition, method or use) will depend upon its virulence against the target bacterial species.

Typically, said one or more bacteriophage(s) may be combined to form a composition comprising at least about $1 \times 10^7$, $1 \times 10^8$, $1 \times 10^9$ or $1 \times 10^{10}$, or $1 \times 10^{11}$ plaque forming units (pfu) of each phage per ml of composition. The composition may comprise $1 \times 10^6$ to $1 \times 10^{11}$ pfu of each phage per ml of composition. Suitably, said one or more bacteriophage(s) may be combined to form a composition comprising at least about $1 \times 10^6$ to $1 \times 10^{11}$ pfu of each phage per ml of composition, such as $1 \times 10^6$, $1 \times 10^7$, $1 \times 10^8$, $1 \times 10^9$ or $1 \times 10^{10}$, or $1 \times 10^{11}$ pfu of each phage per ml of composition. Suitable concentrations include any value or subrange within the indicated ranges, including endpoints In embodiments, the bacteriophage in the composition are purified or substantially purified. Suitably, the composition of purified or substantially purified bacteriophage are free of impurities.

Some aspects relate to, for example, the use of a bacteriophage composition herein as a medicament (e.g., for treating a *Staphylococcus* infection). Suitably, the bacteriophage composition finds particular use in treating a bacterial infection, wherein the bacterial infection comprises (or consists of) *Staphylococcus*. A bacteriophage composition comprising or consisting essentially of Sa87, J-Sa36 and Sa83 or mutants thereof is particularly advantageous when treating a *Staphylococcus aureus* infection.

Some aspects relate to, for example, the use of a bacteriophage composition herein as a medicament (e.g., for treating a *Pseudomonas* infection). Suitably, the bacteriophage composition finds particular use in treating a bacterial infection, wherein the bacterial infection comprises (or consists of) *Pseudomonas*. A bacteriophage composition comprising or consisting essentially of Pa223, Pa222, Pal 93, and Pa204, or mutants thereof is particularly advantageous when treating a *Pseudomonas aeruginosa* infection.

In embodiments, the bacterial infection is a urinary tract infection (or complicated urinary tract infection), intra-abdominal infection (or complicated intra-abdominal infection), or bacteremia. In one embodiment, the bacterial infection is an implant infection, such as a cardiac implant infection (e.g., ventricular assist device infection; pacemaker infection) or prosthetic joint infection. In one embodiment, the bacterial infection is endocarditis or prosthetic valve endocarditis. In one embodiment, the bacterial infection is a skin infection or skin structure infection.

In some embodiments, the bacterial infection is characterized by inflammation. In embodiments, the bacterial infection characterized by inflammation includes bacteremia, septicemia, sepsis, septic shock, infective endocarditis, prosthetic valve endocarditis, diabetic foot ulcers, infections in burn wounds, implant infection such as vertebral osteomyelitis, prosthetic joint osteomyelitis, prosthetic joint infection, aortic and/or mitral valve endocarditis, chronic rhinosinusitis, sinus infection, lung infection, urinary tract infection and intra-abdominal infection.

In some embodiments, the infection is characterized by the presence of a bacterial biofilm. The bacterial infection may be chronic or acute.

In some embodiments, the subject has a bacterial infection that is not responding to one or more antibiotics. In some embodiments, the subject has a bacterial infection that is not responding to standard-of-care antibiotics.

In some embodiments, a bacteriophage composition is administered to a subject at a dosage of at least about $1 \times 10^6$ pfu of each phage, at least about $5 \times 10^6$ pfu of each phage, at least about $1 \times 10^7$ pfu of each phage, at least about $1 \times 10^8$ pfu of each phage, at least about $1 \times 10^9$ pfu of each phage, or at least about $1 \times 10^{10}$ pfu of each phage. A suitable dosage range may be between about $1 \times 10^6$ pfu of each phage to about $1 \times 10^{11}$ pfu of each phage, preferably between about $5 \times 10^7$ pfu of each phage to about $5 \times 10^9$ pfu of each phage. Suitable dosages include any value or range within the recited ranges, including endpoints.

In one embodiment a bacteriophage composition is administered to a subject at a dosage of at least about $1 \times 10^6$ pfu total phage, at least about $1 \times 10^7$ pfu total phage, at least about $1 \times 10^8$ pfu total phage, at least about $1 \times 10^9$ pfu total phage, at least about $1 \times 10^{10}$ pfu total phage, or at least about $5 \times 10^{10}$ pfu total phage. Suitably, the bacteriophage composition may be administered at a dosage of at least about $1 \times 10^7$ pfu total phage or at least about $5 \times 10^9$ pfu total phage. A suitable dosage range may be between about $1 \times 10^6$ pfu total phage to about $5 \times 10^{10}$ pfu total phage, preferably between about $1 \times 10^7$ pfu total phage to about $5 \times 10^9$ pfu total phage. A suitable dosage range may be between about $1 \times 10^8$ pfu total phage to about $5 \times 10^9$ pfu total phage. Suitable dosages include any value or range within the recited ranges, including endpoints.

In some embodiments the bacteriophage composition is administered at least once, twice, three times, or four times daily. Suitably the bacteriophage composition may be administered twice daily. In one embodiment, therefore, a dosage of at least about $5 \times 10^7$ pfu of each phage is administered at least once, twice, three times, or four times daily. In another embodiment at least about $1 \times 10^8$ pfu of each phage is administered at least once, twice, three times, or four times daily. In a further embodiment at least about $1 \times 10^9$ pfu of each phage is administered at least once, twice, three times, or four times daily. Suitably a dosage range between about $1 \times 10^6$ pfu of each phage to about $1 \times 10^{11}$ pfu of each phage may be administered at least once, twice, three times, or four times daily. Preferably a dosage range between about $5 \times 10^7$ pfu of each phage to about $5 \times 10^9$ pfu of each phage may be administered at least once, twice, three times, or four times daily.

In some embodiments the bacteriophage composition is administered every 2 hours, every 4 hours, every 6 hours, ever 12 hours, or every 24 hours. In some embodiments, the bacteriophage composition is administered for at least one week, at least two weeks, at least three weeks, at least four weeks, at least 5 weeks, at least 6 weeks, at least 7 weeks, at least 8 weeks, at least 9 weeks, at least 10 weeks, or longer. In some embodiments, the bacteriophage composition is administered for between about 7 days and about 100 days. Preferably, the bacteriophage composition is administered for between about 14 days and about 56 days.

A bacteriophage composition for use as a medicament may be administered by any route selected on the basis of the condition to be treated. In one embodiment the route of administration is nasal, oral, pulmonary, parenteral, intramuscular, intra-articular, intravenous, subcutaneous, transdermal, ocular, aural or combinations thereof. When used in the treatment of a respiratory bacterial infection, the bacteriophage composition may be administered nasally or orally, for example via aerosolization using an appropriate pulmonary delivery means, such as an inhaler or respirator. The composition may be administered to the patient via more than one route, for example intravenously and by inhalation, or intravenously and intra-articularly.

In one embodiment an antibiotic (suitably a chemical antibiotic) may be administered in combination with the bacteriophage composition. Combinatorial administration of antibiotics and bacteriophages is taught in WO 2008/110840 and WO 2005/009451, which teaching is incorporated herein by reference in its entirety. The antibiotic may be administered simultaneously or sequentially with the bacteriophage composition. Suitably, the one or more antibiotics may be administered after the composition such that bacteriophage replication has become established before antibiotic treatment begins. In this case, antibiotic treatment may be delayed for one or more hours or days from application of the one or more bacteriophages, e.g., from 1 to 2, 3, 4, 5, 6, 7, 8, 9 or 10 days. Where a bacteriophage composition comprising a plurality of bacteriophages is employed with each member of the composition exhibiting different strain specificity, it will suffice that at least a proportion (e.g., one or more bacteriophage(s)) of the composition is capable of targeting the bacterial infection.

Thus, in some embodiments a bacteriophage composition comprises one or more antibiotics, such as one or more chemical antibiotics. An antibiotic may be selected based on sensitivity of a *Staphylococcus* species or strain to said antibiotic. Suitably the *Staphylococcus* species or strain may be the same species or strain present in a subject to be treated. In one embodiment a *Staphylococcus* species or strain is taken from a subject to be treated and tested for antibiotic sensitivity. Sensitivity may be determined by in vitro sensitivity assays known in the art.

Alternatively or additionally, an antibiotic may be selected because it is known to be active against a bacteria known to be (or thought likely to be) present together with a *Staphylococcus* infection to be treated (e.g., as part of a bacterial biofilm).

In one embodiment an antibiotic is one or more selected from: vancomycin, teicoplanin, penicillin, methicillin, flucloxacillin, dicloxacillin, cephalosporins (e.g., cefazolin, cephalothin, cephalexin), clindamycin, lincomycin, erythromycin, or combinations thereof. Suitably the antibiotic may be vancomycin and/or teicoplanin.

Thus, in some embodiments an antibiotic may be selected based on sensitivity of a *Pseudomonas* species or strain to said antibiotic. Suitably the *Pseudomonas* species or strain may be the same species or strain present in a subject to be treated. In one embodiment a *Pseudomonas* species or strain is taken from a subject to be treated and tested for antibiotic sensitivity. Sensitivity may be determined by in vitro sensitivity assays known in the art.

Alternatively or additionally, an antibiotic may be selected because it is known to be active against a bacteria known to be (or thought likely to be) present together with a *Pseudomonas* infection to be treated (e.g., as part of a bacterial biofilm).

In one embodiment, an antibiotic comprises (or consists of) an antibiotic from one of the following antibiotic classes: fluoroquinolone, carbapenem, aminoglycoside, cephalosporin, penicillin, beta lactam, or beta lactamase inhibitor. Non-limiting examples include imipenem, gentamycin, amikacin, ciprofloxacin, ceftazidime, piperacillin or combinations thereof, or pharmaceutically acceptable salts thereof.

In one embodiment a use or method comprises: (a) administration of a bacteriophage composition to a subject in vivo; (b) in vitro monitoring of the sensitivity of a sample of bacterial cells from an infection (e.g., present in the subject) or from another infection by the same strain to one or more antibiotic(s); and (c) administration of said one or more antibiotic(s), when it has been established that said sensitivity to said one or more antibiotic(s) has been induced.

In one embodiment the antibiotic (e.g., chemical antibiotic) is administered at a time period at which sensitivity of sampled bacteria to the antibiotic is induced by the composition. In some embodiments the time period may be at least 12, 24 or 48 hours. In other embodiments the bacteriophage composition and the antibiotic may be administered at intervals of one day to two months apart, preferably at intervals of one to four weeks apart, suitably at intervals of two weeks apart.

In one embodiment an antibiotic is administered at a dose of at least 50, 100 or 150 mg/kg once or twice daily. Suitably an antibiotic may be administered at a dose of 100 mg/kg once or twice daily.

In one embodiment is provided a method for restoring sensitivity to an antibiotic(s) by administering a composition as described herein. In one embodiment is provided a method for disrupting a biofilm by administering a composition as described herein. In one embodiment is provided a method for destroying a biofilm by administering a composition as described herein.

In one embodiment the surface is the skin of a mammal (e.g., a human), for example a nasal cavity.

Some aspects relate to, for example, a kit comprising: a bacteriophage composition; and instructions for use of same (e.g., in medicine). The kit may further comprise an antibiotic (e.g., a chemical antibiotic) and instructions for use of same in combination with the bacteriophage composition.

In one embodiment the instructions provide details for dosing a bacteriophage composition as described herein. In one embodiment the instructions included in a kit are for use of same in treating a *Staphylococcus* infection. In one embodiment the instructions included in a kit are for use of same in treating a *Pseudomonas* infection.

A bacteriophage composition may also be comprised in a bandage or wound dressing. The wound dressing may be a pad or sticking plaster-type dressing. The bacteriophages may be applied to the wound dressing or bandage as a disinfectant formulation or topical cream, prior to applying to the wound dressing or bandage. Alternatively, the wound dressing or bandage may be soaked in a carrier containing the bacteriophages and dried to impregnate said bacteriophages within the dressing or bandage. Bacteriophages may also be adsorbed onto the surface of the bandage or wound dressing using techniques generally known in the art. The advantage of this approach is that the bandage or wound dressing allows the bacteriophages to be brought into contact with a wound which may contain the bacteria. One aspect relates to, for example, methods of inhibiting or treating bacteria by applying a bandage or wound dressing to a subject.

The bacteriophage composition is particularly advantageous for use in medicine, and shows clinical efficacy in the treatment of bacterial infections characterized by inflammation.

In embodiments, the bacteriophage compositions provided herein reduce the inflammatory response. In embodiments, the bacteriophage compositions provided herein reduce the inflammatory response by downregulating gene expression of inflammatory genes and/or upregulating gene expression of anti-inflammatory genes. The genes involved in the inflammatory response include immediate early, TLR cascade, T-cell induction, TLR(4) cascade, NK induction, and infl. Cell adhesion. Examples of genes that may be up or down regulated include but are not limited to IL13, CBG, KIR-IS2, IFN-gamma, MTMR14, FN1, CXCL11, DNAJC14, MAP2K2, TICAM1, TICAM2, CD1delta, IL15, and THY1.

In embodiment, samples are from patients before the first dose of bacteriophage treatment and assayed for gene expression to provide a baseline or first gene expression profile. In embodiments, subsequent blood samples are taken from patients at a time point after the first dose of bacteriophage treatment. In embodiments the time point after the first dose from about 1 minute to about 10 minutes, greater than 10 minutes, from about 1 minute to about 60 minutes, from about 10 minutes to about 50 minutes, from about 20 minutes to about 40 minutes, about 30 minutes, or greater than 60 minutes. In embodiments the time point after the first dose is 1, 2, 3, 4, 5, 6, 7, 8, 9, 10, 11, 12, 13, 14, 15, 16, 17, 18, 19, 20, 21, 22, 23, 24 hours or greater. In some embodiments, the time point after the first dose is from about 24 to about 48 hours. In some embodiments, the time point after the first dose is greater than 48 hours.

Each subsequent sample was assayed for gene expression to provide a subsequent gene expression profile. Gene expression was assayed using a gene expression panel by methods known in the art. Genes involved in the inflammatory response include immediate early, TLR cascade, T-cell induction, TLR(4) cascade, NK induction, and infl. Cell adhesion. Examples of genes that may be up or down regulated include but are not limited to IL13, CBG, KIR-IS2, IFN-gamma, MTMR14, FN1, CXCL11, DNAJC14, MAP2K2, TICAM1, TICAM2, CD1 delta, IL15, and THY1.

Some embodiments of the bacteriophage compositions are efficacious against a broad spectrum of *Staphylococcus* species and strains. Some embodiments of the bacteriophage composition are efficacious against a broad spectrum of *Pseudomonas* species and strains.

EXAMPLES

Example 1: Bacteriophage Administration to Human Patients

Bacteriophage cocktails were administered to human patients having *S. aureus* infections that did not respond to antibiotic treatment alone. The patients were suffering from bacteremia and septicemia, endocarditis (native valve), prosthetic valve endocarditis, left ventricular assist device (LVAD) infection, prosthetic joint infection, and/or chronic rhinosinusitis.

A bacteriophage composition "cocktail", containing approximately equal ratios of three bacteriophage, Sa87, J-Sa36, Sa83, was administered to patients having *S. aureus* infections. Infections in the treated patients included bacteremia, septicemia, sepsis, vertebral osteomyelitis, prosthetic hip osteomyelitis, septic shock, endocarditis (metallic mitral and aortic valve), endocarditis (bioprosthetic aortic valve). The phage cocktail had approximately 95% coverage of *S. aureus* strains, including multidrug-resistant isolates. Susceptibility of *S. aureus* isolates from the patients was determined by soft agar overlay small drop assay prior to treatment. Patients were treated with $3 \times 10^9$ PFU of the phage cocktail via intravenous administration every 12 hours. Therapy was administered for 14 to 56 days, depending on indication. Patients were also administered the best available antibiotic therapy, as determined by the attending physician.

Blood samples were taken from patients before the first dose of bacteriophage treatment and assayed for gene expression to provide a baseline or first gene expression profile. Subsequent blood samples were taken from patients 15-30 minutes and 48 hours after the first dose of bacteriophage treatment. Each subsequent sample was assayed for gene expression to provide a subsequent gene expression profile. Gene expression was assayed using a gene expression panel by NanoString according to manufacturer's protocol. Genes involved in the inflammatory response include immediate early, TLR cascade, T-cell induction, TLR(4) cascade, NK induction, and infl. Cell adhesion. Examples of genes that may be up or down regulated include but are not limited to IL13, C8G, KIR-IS2, IFN-gamma, MTMR14, FN1, CXCL11, DNAJC14, MAP2K2, TICAM1, TICAM2, CD1delta, IL15, and THY1.

Figure 2:
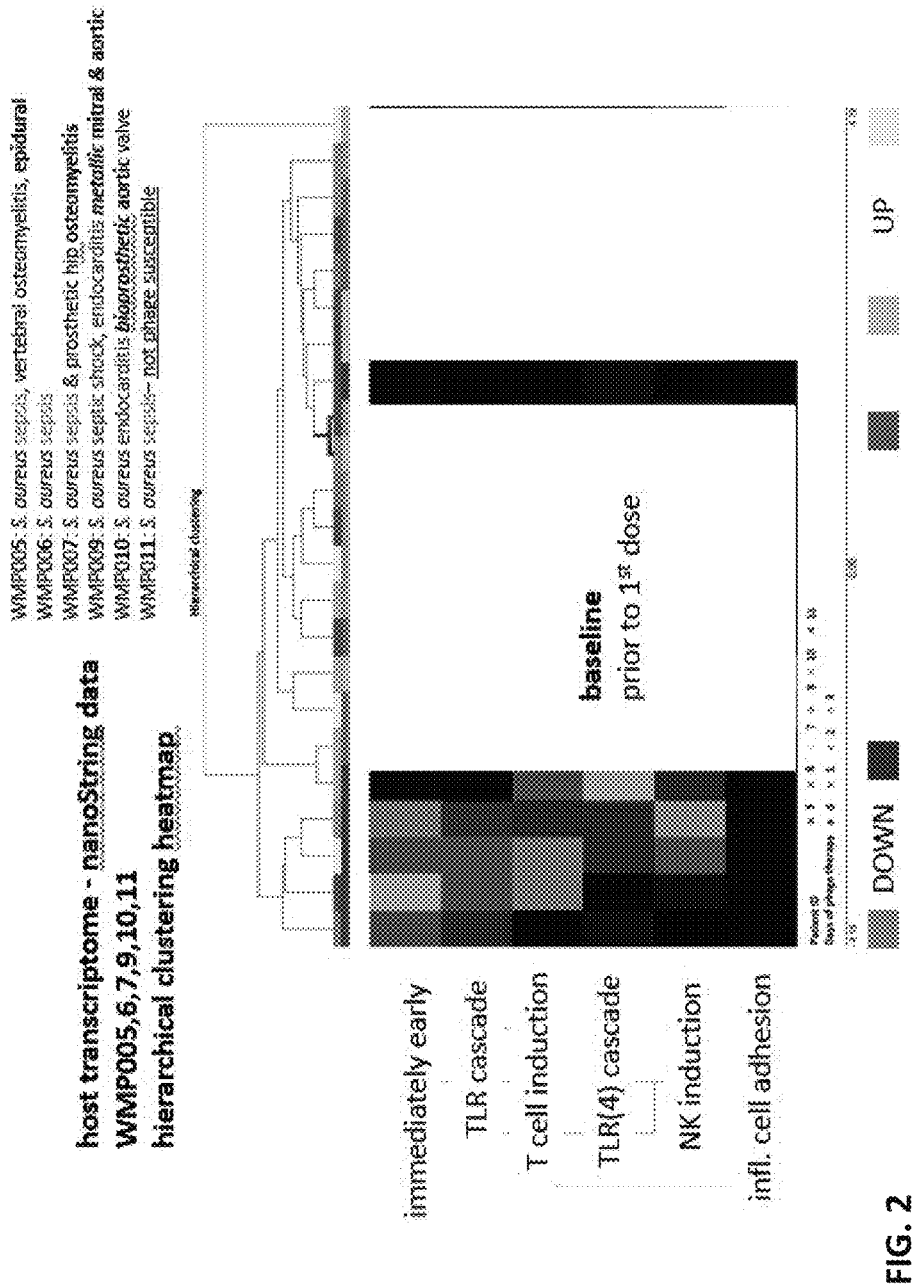
FIG. 2 depicts the upregulated and downregulated gene expression in six different patients with bacterial infections characterized by inflammation and caused by *S. aureus*. Samples were taken before the first dose of bacteriophage treatment in the patients and represents the baseline gene expression profile.
Figure 3:
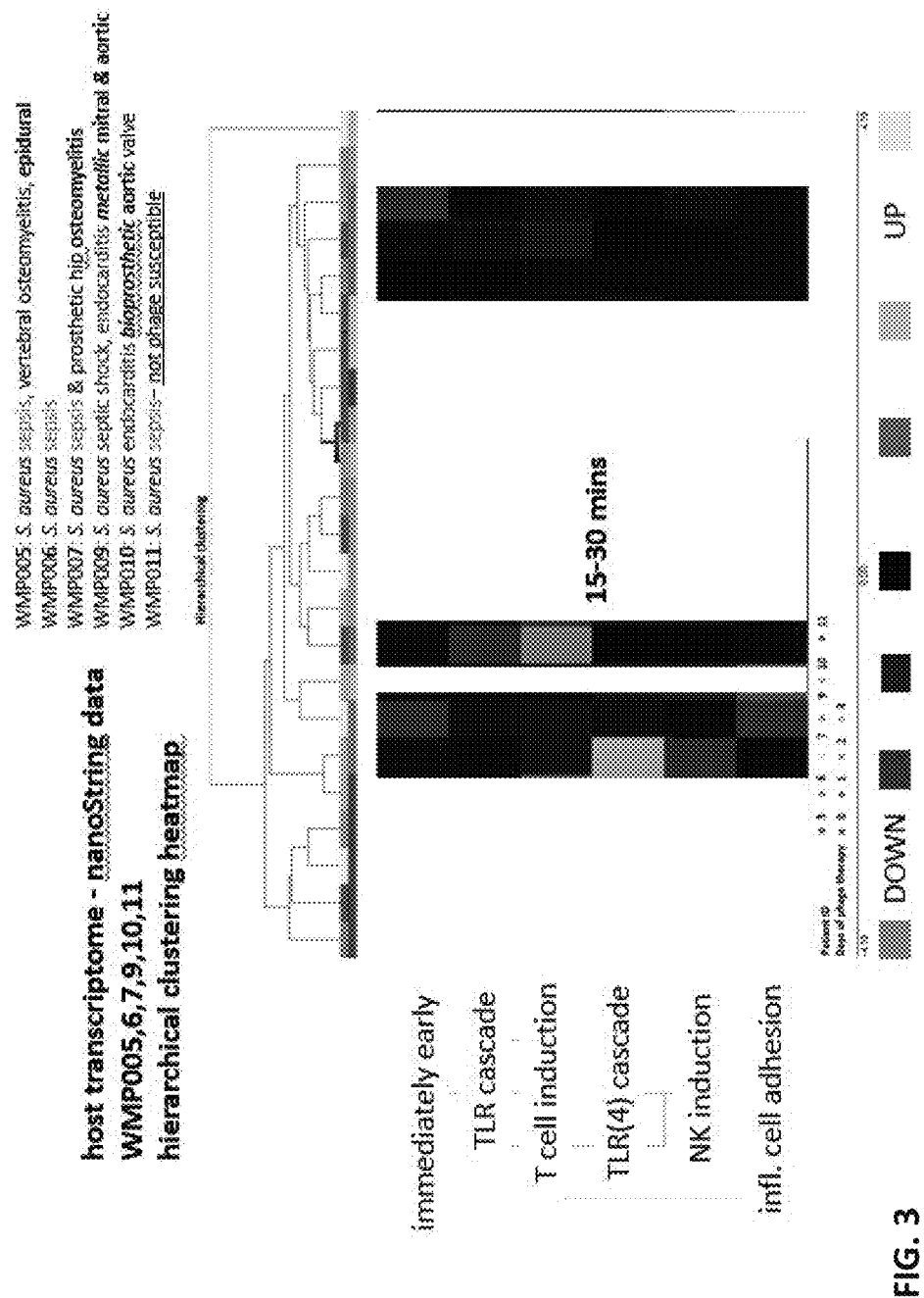
FIG. 3 depicts the upregulated and downregulated gene expression in six different patients with bacterial infections characterized by inflammation and caused by *S. aureus*. Samples were taken 15-30 minutes after the first dose of bacteriophage treatment in the patients and represents changes occurring in gene expression profile after bacteriophage treatment.
Figure 4:
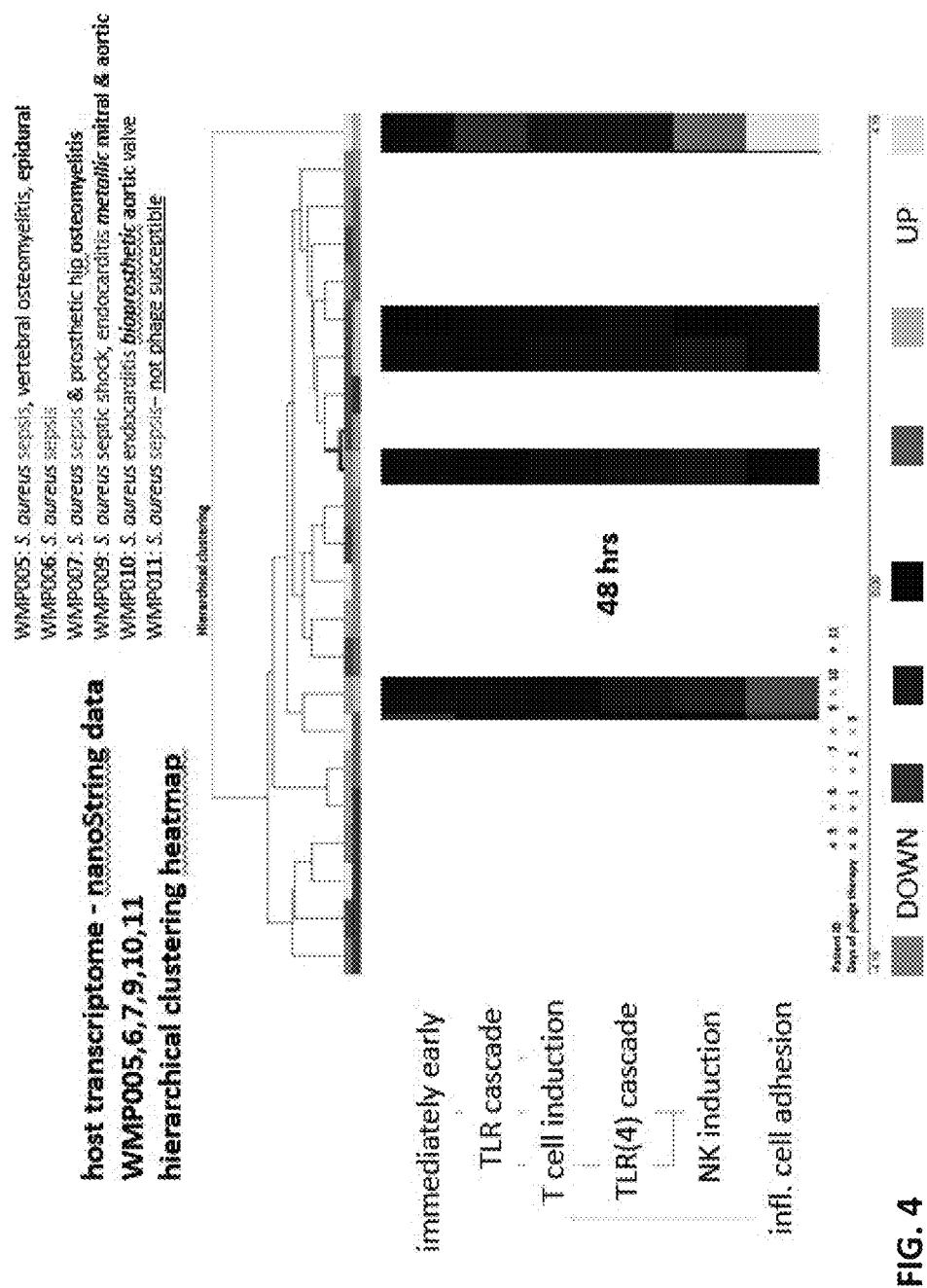
FIG. 4 depicts the upregulated and downregulated gene expression in six different patients with bacterial infections characterized by inflammation and caused by *S. aureus*. Samples were taken 48 hours after the first dose of bacteriophage treatment in the patients and represents changes occurring in gene expression profile after bacteriophage treatment.

FIG. 1 summarizes the gene expression profile change before and after bacteriophage treatment. As shown in FIG. 2, there was greater gene expression (characterized by yellow shading) in inflammatory genes for patients 5, 6, 7, 8, and 10. As shown in FIG. 3, there was down regulation of the inflammatory genes within 15-30 in the patient samples. As shown in FIG. 4, by 48 hours many of the inflammatory genes were still down regulated in terms of gene expression as compared to baseline.

Figure 5:
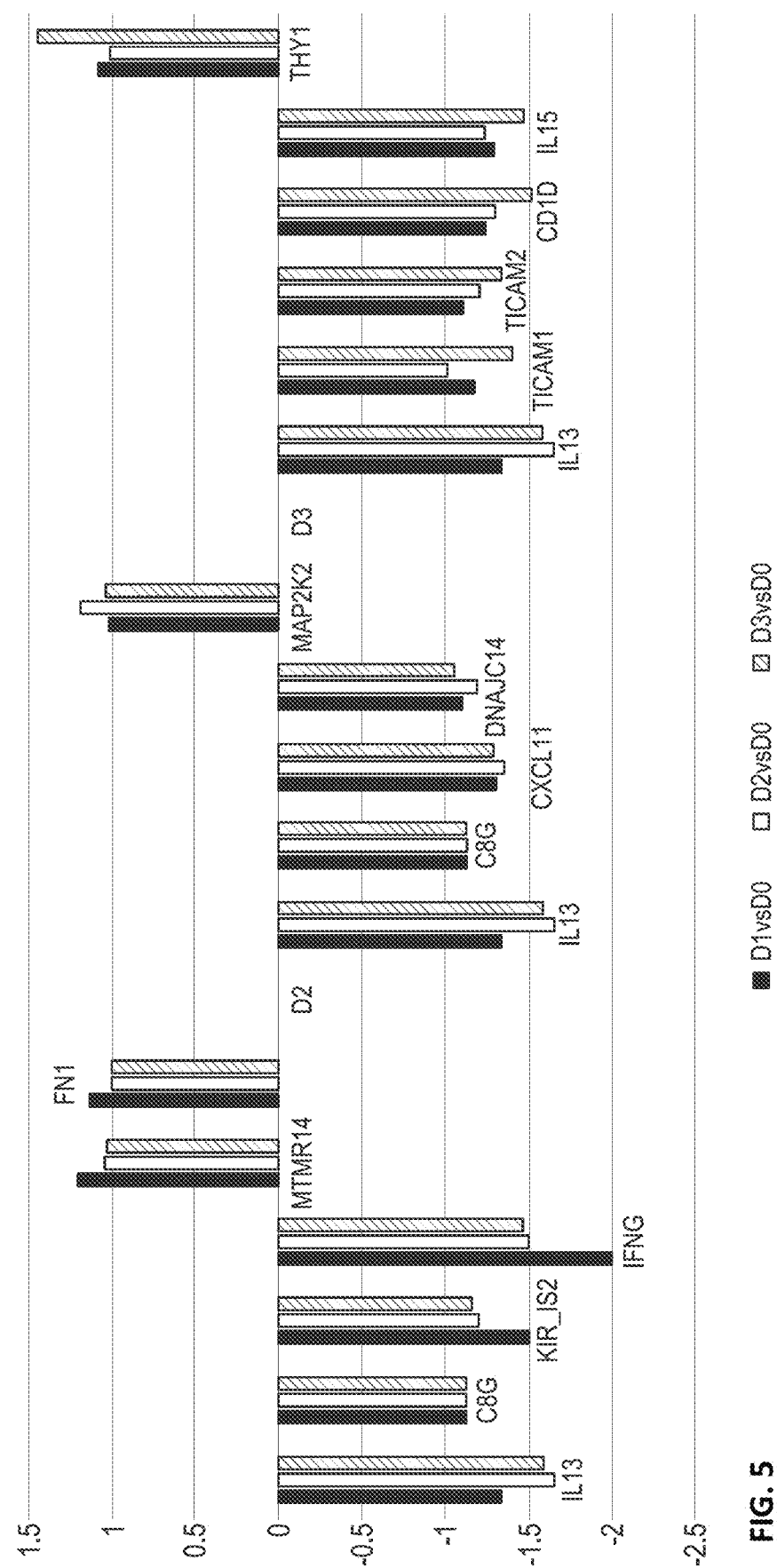
FIG. 5 depicts the change in gene expression for IL13, CBG, KIR-IS2, IFN-gamma, MTMR14, FN1, CXCL11, DNAJC14, MAP2K2, TICAM1, TICAM2, CD1delta, IL15, and THY1 pre and post phage treatment in three patients

FIG. 5 shows the change in gene expression for IL13, C8G, KIR-IS2, IFN-gamma, MTMR14, FN1, CXCL11, DNAJC14, MAP2K2, TICAM1, TICAM2, CD1delta, IL15, and THY1 pre and post phage treatment in three patients.

It was also noted that there appear to be systemic benefits to phage therapy include cardioprotective and pulmonary protective gene expression.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

The invention claimed is:

1. A method for determining efficacy of a bacteriophage formulation to reduce inflammatory response in a subject receiving bacteriophage therapy to treat an inflammatory bacterial infection, the method comprising:
   a) obtaining a first gene expression profile for two or more informative genes in a first biological sample, wherein the first biological sample is obtained from the subject prior to administration of the bacteriophage therapy;
   b) obtaining a subsequent gene expression profile for the two or more informative genes in one or more subsequent biological samples, wherein the one or more subsequent biological samples are obtained from the subject after administration of the bacteriophage therapy;
   c) correlating the first gene expression profile and the subsequent gene expression profile, wherein said correlating step comprises assigning the difference in the first and subsequent gene expression profiles a positive, intermediate, or negative assay score; and
   d) treating the patient based on the positive, intermediate, or negative assay score wherein treatment comprises therapeutic intervention; wherein:
   a positive assay score is indicative that the bacteriophage formulation is efficacious in reducing inflammatory response in the subject and treating a subject with a positive assay score at step d) comprises administering the bacteriophage formulation to the subject; and
   a negative or intermediate assay score is indicative that the bacteriophage formulation is not efficacious in reducing inflammatory response in the subject and treating a subject with a negative or intermediate assay score at step d) comprises a therapeutic intervention which is different to the bacteriophage formulation; and
   wherein the therapeutic intervention at step d) comprises administering one or more of an antibiotic, bacteriophage therapy, and an immunomodulatory treatment to the subject.

2. The method of claim 1, wherein the two or more informative genes are inflammatory genes, anti-inflammatory genes, and genes involved in the inflammatory response.

3. The method of claim 2, wherein the genes involved in the inflammatory response are immunomodulatory genes.

4. The method of claim 3, wherein the two or more informative genes are independently selected from genes associate with immediate-early response, Toll-like receptor (TLR) signalling, T-cell induction, Natural Killer (NK) cell induction and/or cell adhesion.

5. The method of claim 4, wherein the two or more informative genes are independently selected from genes encoding interleukin 13 (IL13), complement C8 gamma chain (C8G), Killer cell immunoglobulin-like receptors (KIR), KIR insertion element 2 (KIR-IS2), interferon-gamma (IFN-gamma), myotubularin-related protein 14 (MTMR14), fibronectin 1 (FN1), chemokine (C-X-C motif) ligand 11 (CXCL11), DnaJ homolog subfamily C member 14 (DNAJC14), Mitogen-Activated Protein Kinase Kinase 2 (MAP2K2), Toll-interleukin-1 receptor domain-containing adapter 1 (TICAM1), Toll-interleukin-1 receptoir domain-containing adapter 2 (TICAM2), cluster of differentiation 1 delta (CD1d), interleukin-15 (IL15), and thymus cell antigen 1 (THY1).

6. The method of claim 1, wherein a bacterial infection is an infection characterized by an inflammatory gene expression profile.

7. The method of claim 1, wherein:
   a positive assay score comprises downregulation in expression of one or more informative genes which are inflammatory genes and/or genes involved in the inflammatory response in the one or more subsequent biological samples, and upregulation in expression of one or more informative genes which are anti-inflammatory genes in the one or more subsequent biological samples;
   an intermediate assay score comprises a non-significant change in expression of one or more informative genes which are inflammatory genes, genes involved in the inflammatory response, and/or anti-inflammatory genes in the one or more subsequent biological samples; and
   a negative assay score comprises upregulation in expression of one or more informative genes which are inflammatory genes and/or genes involved in the inflammatory response in the one or more subsequent biological samples, and downregulation in expression of one or more informative genes which are anti-inflammatory genes in the one or more subsequent biological samples.

8. The method of claim 1, wherein the subject has a bacterial infection.

9. The method of claim 8, wherein:
   the bacterial infection is selected from the group consisting of bacteremia, septicemia, sepsis, septic shock, infective endocarditis, biofilm associated infections, an implant infection, chronicrhinosinusitis, sinus infection, lung infection, urinary tract infection, and/or intra-abdominal infection; and/or
   the bacterial infection is resistant to antibiotics.

10. The method of claim 9, wherein the implant infection is a cardiac implant infection, prosthetic joint infection, infective endocarditis, and/or prosthetic valve endocarditis.

11. The method of claim 8, wherein the bacterial infection is an infection by one or more bacteria comprising *Staphylococcus aureus* and/or *Pseudomonas aeruginosa*.

12. The method of claim 1, wherein the bacteriophage formulation comprises one or more bacteriophage that infect and *lyse Staphylococcus* and/or *Pseudomonas*.

13. The method of claim 12, wherein:
the *Staphylococcus* is *Staphylococcus aureus*, optionally wherein the *Staphylococcus aureus* is methicillin-resistant;
the *Pseudomonas* is *Pseudomonas aeruginos*, optionally wherein the *Pseudomonas aeruginosa* is multi-drug resistant; and/or,
the bacteriophage formulation comprises one or more bacteriophages from a bacteriophage family selected from the group consisting of Myoviridae, Siphoviridae, Podoviridae, Lipothrixviridae, Rudiviridae, Ampul laviridae, Bicaudavindae, Clavaviridae, Cortico Vindae, Cystoviridae, Fuselloviridae, Globuloviridae, Guttaviridae, Inoviridae Leviviridae, Microviridae, Plasmaviridae, and Tectiviridae.

14. The method of claim 1, wherein the antibiotic is a fluoroquinolone, carbapenem, aminoglycoside, cephalosporin, penicillin, beta lactam, or beta lactamase inhibitor.

15. The method of claim 1, wherein the bacteriophage formulation comprises a pharmaceutically acceptable carrier, diluent, excipient, or combinations thereof comprising MgSO4.

16. The method of claim 1, wherein at least one subsequent biological sample is obtained from the subject at least 15 minutes after administration of a first dose of the bacteriophage formulation and/or at least 48 hours after administration of a first dose of the bacteriophage formulation.

* * * * *